United States Patent
Le Paih et al.

(10) Patent No.: US 9,936,710 B2
(45) Date of Patent: Apr. 10, 2018

(54) PORTIONING METHOD AND DEVICE COMPRISING PARTICULAR CLAMPS

(71) Applicant: MAREL FRANCE, Baud (FR)

(72) Inventors: Jacques Le Paih, Plumeliau (FR); Adrianus Van Den Nieuwelaar, Gemert (NL); Sigebertus Meggelaars, Eindhoven (NL); Fabrice Le Pabic, Camors (FR)

(73) Assignee: MAREL FRANCE, Baud (FR)

( * ) Notice: Subject to any disclaimer, the term of this patent is extended or adjusted under 35 U.S.C. 154(b) by 667 days.

(21) Appl. No.: 14/385,868

(22) PCT Filed: Mar. 20, 2013

(86) PCT No.: PCT/EP2013/055815
§ 371 (c)(1),
(2) Date: Dec. 18, 2014

(87) PCT Pub. No.: WO2013/139854
PCT Pub. Date: Sep. 26, 2013

(65) Prior Publication Data
US 2015/0099441 A1 Apr. 9, 2015

(30) Foreign Application Priority Data
Mar. 20, 2012 (FR) .................................... 12 52504

(51) Int. Cl.
*A22C 11/00* (2006.01)
*A22C 11/10* (2006.01)

(52) U.S. Cl.
CPC .......... *A22C 11/104* (2013.01); *A22C 11/006* (2013.01); *A22C 11/105* (2013.01)

(58) Field of Classification Search
CPC ....... A22C 11/00; A22C 11/001; A22C 11/02; A22C 11/0245
USPC .......... 452/21–26, 30–32, 35–37, 46–48, 51; 99/516, 353, 450.1, 450.2, 450.6, 352, 99/355, 441; 426/513, 516, 37, 277, 105
See application file for complete search history.

(56) References Cited

U.S. PATENT DOCUMENTS

| 7,762,874 B2 * | 7/2010 | Schlieber ............. | A22C 11/104 452/37 |
| 7,862,407 B2 * | 1/2011 | Panizzon ............. | A22C 11/104 452/25 |
| 2008/0307758 A1 | 12/2008 | Schalk | |

FOREIGN PATENT DOCUMENTS

| DE | 102004022716 A1 | 12/2004 |
| JP | 2008540259 A | 11/2008 |
| WO | 2008/155491 A2 | 12/2008 |
| WO | 2010/006893 A1 | 1/2010 |

* cited by examiner

*Primary Examiner* — Richard T Price, Jr.
(74) *Attorney, Agent, or Firm* — Zarley Law Firm, P.L.C.

(57) ABSTRACT

The invention relates to a method and device for producing portions from a strand (B), in particular for the production of sausages, comprising at least one pair of opposing clamps (1, 1') that can be moved towards one another by actuating means, from an open position to a closed position in order to clamp the strand. Each clamp comprises clamping means (2, 2', 3, 3') that can he maneuvered by the aforementioned actuating means (70, 9; 70', 9') in order to clamp the strand onto a central strand segment, and subsequently to clamp the strand onto side strand segments on each side of the central segment.

16 Claims, 7 Drawing Sheets

PORTIONING METHOD AND DEVICE COMPRISING PARTICULAR CLAMPS

BACKGROUND OF THE INVENTION

The present invention relates to a method and device for producing portions from a continuous strand in order to produce individual portions, and more particularly a portioning device comprising at least one pair of particular clamps, in particular for the production of sausages from a continuous strand consisting of a food product such as minced meat or fish and/or vegetables, covered with a skin or casing.

The prior art includes, in particular in the patent documents WO2008/155491 and WO2010/006893, and U.S. Pat. No. 7,762,874, portioning devices for manufacturing products such as sausages comprising a pair of opposing clamps suitable for being moved towards each other by actuating means from an open position to a closed position in order to clamp the strand. Each clamp of the pair comprises clamping means formed from a plurality of clamping plates each equipped at the end with a front clamping edge. The two clamps are offset in relation to each other such that, when moved to the closed position, the plates are moved simultaneously and overlap in a manner similar to shears, and form via the clamping edges thereof passages or diaphragms with progressively decreasing cross-sections. The diaphragms have a minimum cross-section different to zero in the closed position of the clamps. The portioning devices comprises cutting means comprising a blade associated with the pair of clamps, suitable for being actuated to cut the strand when the clamps are in the closed position.

These clamp systems provide progressive clamping around the strand which limits risks of tearing of the casing thereof, in particular in the case of the manufacture of sausages from a continuous strand obtained by coextrusion of a food product coated with a starting base, comprising for example one or a plurality of hydrocolloids, wherein said base is intended to form the casing by gelling in a bath arranged downstream from the coextrusion device and upstream from the portioning device.

After performing cutting and moving the clamps to the open position thereof, the food product tends to come out of the casing via the open ends of the sausage. The openings at the end of the sausage may be up to 4 to 8 mm.

The aim of the present invention is that of providing a portioning device remedying the abovementioned drawbacks, or even preventing the opening of the ends of the portions after the cutting operation, particularly in the case of sausages having a coextruded casing.

SUMMARY OF THE INVENTION

For this purpose, the present invention relates to a device for producing portions from a continuous strand in order to produce portions, in particular sausages, comprising at least one pair of opposing clamps suitable for being moved towards each other by actuating means, from an open position to a closed position in order to clamp the strand so as to form portions, characterised in that each clamp of the pair comprises clamping means suitable for being manoeuvred by said actuating means in order to clamp the strand along a central strand segment, and subsequently to clamp the stand along side strand segments arranged on each side of the central segment.

In the case of the manufacture of sausages obtained from a strand formed from a food product encased in a casing, the clamps of the portioning device according to the invention make it possible to progressively push the food product from the casing along a first central segment of the strand casing, and subsequently on second side segments on each side of the central segment. This two-phase action of the clamps on the strand makes it possible to empty the casing over a significant length corresponding to the cumulative lengths of the central segment and the side segments, limiting the opening of the ends of the portions after subsequent cutting at the emptied central segment of the casing.

According to one embodiment, each clamp of the pair comprises central clamping means and side clamping means arranged on each side of the central clamping means, said actuating means being suitable for manoeuvring the central clamping means of the clamps transversally to the strand, to an intermediate closed position of the clamps in order to clamp the strand via said central clamping means along the central strand segment, and subsequently manoeuvring the side clamping means transversally to the strand, to the closed position of the clamps in order to clamp the strand via the side clamping means on each side of the central clamping means, along the side strand segments.

According to a further embodiment, each clamp of the pair comprises clamping means suitable for being manoeuvred by said actuating means transversally to the strand in order to clamp the strand along a central strand segment, and subsequently for being manoeuvred parallel to the strand in order to clamp the strand along the side segments.

According to one specific aspect, each clamp further comprises holding means, arranged on each side of the clamping means, suitable for being moved by said actuating means in order to abut the strand on the outer segments of said strand arranged on each side of the side segments, in the closed position of the clamps, in order to hold said strand.

The casing being emptied over a significant length, these holding means, also referred to as centring means or anti-splitting means, abutting the strand, make it possible to guide towards the centre of the sausages the large quantity of food product pushed from the emptied casing segments, and thus prevent an excessive increase in the diameter of the strand on each side of the emptied segments, which could cause the casing to split. These means further make it possible to centre the strand when portioning the strand.

Due to these holding means, the internal pressure in the casing resulting from the clamping is moved towards the centre of the sausages, which limits, or even prevents the opening of the sausages after performing the cutting operations and manoeuvring the clamps to the open position thereof. Moreover, the internal food product pressure is better distributed along the sausage, which limits, or even eliminates the sausage curving phenomenon conventionally occurring with the devices according to the prior art, and thus makes it possible to obtain straight sausages, that are easy to package in trays.

This embodiment ensures that the ends of the portions are sealed correctly. After removing the clamps, the product pushed by the clamps partially returns to the emptied segments of significant length. The resulting sausage has at the end small emptied casing tails, and is comparable to the products conventionally obtained from a twisted and cut strand.

According to one embodiment, the holding means comprise at least one holding block arranged on each side of the clamping means, and provided with a holding surface which is transversally outwardly offset in relation to the clamping means in the open position of the clamps and in the closed position of the clamps.

According to one embodiment, for each clamp of the pair, the central clamping means comprise at least one central clamping plate provided at the end with a clamping edge, for example substantially V-shaped, and the side clamping means comprise at least one side clamping plate arranged on each side of the central clamping plate, and provided at the end with a clamping edge, for example substantially V-shaped, the two clamps being offset in relation to each other such that, when moved to the closed position, the central and side clamping plates overlap in a manner similar to shears, and form via the clamping edges thereof one central passage or diaphragm and two side passages or diaphragms with progressively decreasing cross-sections, said central passage having a minimum cross-section different to zero in the closed position of the clamps, for each clamp, the clamping edges of the side plates are transversally outwardly offset in relation to the clamping edge of the central clamping plate in the open position of the clamps, said actuating means being suitable for manoeuvring the central clamping plate and the side clamping plates in order to progressively and simultaneously reduce the cross-sections of the side passages and the central passage, from the open position of the clamps to an intermediate closed position wherein the central passage has a minimum cross-section that is different to zero and the side passages have cross-sections greater than the minimum cross-section of the central passage, subsequently manoeuvring the side clamping plates in order to progressively reduce the cross-sections of the side passages, from the intermediate closed position to the closed position wherein the side passages have minimum cross-sections that are different to zero and identical, or substantially identical, to the minimum cross-section of the central passage.

The transversal offsets between the clamping edges of the side plates and the clamping edge of the central plate are preferably identical in the open position and in the intermediate closed position of the clamps.

According to one specific aspect, each block comprises at least one holding plate arranged on the outside of each side clamping plate, and provided at the end with a holding edge wherein a rear portion forms said holding surface, the holding edges being transversally outwardly offset in relation to the clamping edges of the side plates in the open position of the clamps, the holding plates overlap in the form of shears, and form via the holding edge thereof respectively an outer passage wherein the cross-section decreases progressively when the clamps move to the closed position, said actuating means being suitable for manoeuvring the holding plates in order to progressively and simultaneously reduce the outer passages, from the open position to the intermediate closed position, said outer passages having cross-sections greater than the minimum cross-sections of the side passages, and subsequently from the intermediate closed position to the closed position wherein the outer passages have cross-sections greater than the minimum cross-sections of the side passages, and preferably less than or equal to the cross-section of the strand to be portioned.

According to this embodiment, the clamps further have holding plates wherein the cross-sections of the outer passages in the closed position of the clamps are greater than the minimum cross-sections of the primary and secondary passages, for example substantially less than or equal to the cross-section of the strand to be portioned.

The holding means, in this case consisting of holding plates, are removed from the casing cutting zone, and do not perform an operation for forming the ends of the portions. When the holding plates form passages wherein the cross-sections in the closed position are less than the cross-section of the strand to be portioned, the areas of the portions in contact with the holding plates in the closed position generally return to the original cross-section thereof after the cutting operation and the movement of the clamps to the open position.

By way of example, for a strand to be portioned approximately 22 mm in diameter, the casing is emptied over approximately 25 mm via the central plates and the side plates, and is held on each side of the emptied portion along approximately 12.5 mm via the holding plates, and is for example reduced to a diameter of approximately 18 mm via said holding plates.

According to one embodiment, the holding edge of each holding plate of a block comprises a rear portion, forming the holding surface, extended by an upper portion and a lower portion, each clamp comprises a block wherein each holding plate comprises a notched upper portion and a continuous lower portion, and a block wherein each holding plate comprises a notched lower portion and a continuous upper portion, and for two opposing blocks, each holding plate of the block of a clamp has a notched upper portion and a continuous lower portion, and each holding plate of the block of the other clamp has a continuous upper portion and a notched lower portion, the notches of said notched portions prevent the strand from slipping along said notched portions when the clamps move from the intermediate closed position to the closed position, so as to twist the central portion.

According to one embodiment, each clamp comprises at least two central clamping plates, wherein the clamping edges are aligned, and/or at least two side clamping plates on each side of the central clamping plates.

The use of a plurality of clamping plates enables the use of plates of restricted width, ensuring effective clamping of the strand without damaging same, while obtaining a significant length of emptied casing.

Preferably, the clamps are formed with plates of identical widths. Preferably, the length of casing emptied by the central clamping plates is equal to the length of casing emptied by the side clamping plates. Each clamp thus comprises a number of side plates equal to the number of central plates, the side plates being distributed in an equal number on each side of the central plates.

Preferably, the clamps of one pair comprise an identical number of plates.

According to one embodiment, each clamp comprises at least four central clamping plates, and at least two side clamping plates on each side of the central clamping plates.

According to one embodiment, each clamp comprises at least two holding plates on each side of the central and side clamping plates.

Preferably, the length of casing held by the holding plates is equal to the total length of casing emptied by the central and side plates. Each clamp thus comprises a number of holding plates equal to the number of central plates and side plates, the holding plates being equally distributed on each side of the clamping plates.

According to one embodiment, each clamp comprises at least four holding plates on each side of the central and side clamping plates. Preferably, said clamps are arranged such that the clamping plates thereof and the holding plates thereof are positioned in alternation in the closed position of the clamps, two adjacent is plates not belonging to the same clamp.

According to one embodiment, the central clamping plates and the side clamping plates of each clamp are mounted on a mounting support, said actuating means being suitable for moving the mounting supports according to a to-and-fro movement perpendicular to the strand feed direction, the central clamping plates being slidably mounted on the mounting support thereof, perpendicular to the strand feed direction and moved by first elastic means to an idle position, said central plates of a clamp being suitable for abutting against bearing edges of the intermediate plate of the other clamp in the intermediate closed position of the clamps and for moving in relation to the mounting support thereof to an intermediate retracted position when the clamps are moved from the intermediate closed position to the closed position.

According to one embodiment, the device comprises cutting means comprising at least one blade associated with the pair of clamps suitable for being manoeuvred by actuating means between two adjacent central clamping plates in order to cut the strand.

According to one embodiment, the blade is pivotally mounted on the mounting support of a first clamp, said actuating means being suitable for pivoting said blade between a retracted position and an active cutting position, the blade is moved by elastic return means to the retracted position thereof, the actuating means being mounted on the second clamp of the pair and preferably comprising a tappet mounted on the mounting support of the second clamp, suitable for abutting the blade in order to manoeuvre the blade towards the active position thereof against the elastic return means.

According to one embodiment, the side clamping plates are slidably mounted on the mounting support thereof and are moved by second elastic means into an idle position, said side clamping plates of a clamp being suitable for abutting against bearing edges of intermediate plates of the other clamp in the closed position of the clamps, the central clamping plates and the side clamping plates, abutting against the bearing edges, being suitable for moving in relation to the mounting support thereof to a retracted position, against the elastic return means thereof, when said clamps are moved from the closed position to a so-called cutting position by approaching the mounting support thereof, the tappet moving the blade from the retracted position thereof to the active position thereof when moving from the closed position to the cutting position.

This slidable assembly of the plates with an additional stroke of the mounting supports when the clamps are in the closed position thereof makes it possible to only cut the strand once the side passages and the central passages have attained the minimum cross-section thereof.

According to one embodiment, said clamp actuating means are suitable for approaching and separating the clamps according to a to-and-fro direction both in the orthogonal direction and the parallel direction to the strand feed direction, the clamp movement speed being substantially equal to the strand feed speed when the clamps are in contact with the strand for the clamping and cutting operations, and optionally variable outside clamping and cutting operations.

According to one embodiment, the clamps are rotatably mounted on two rotary disks about an axis substantially parallel to the axes of rotation of the rotary disks and perpendicular to the strand feed direction, the disks being rotated by at least one motor.

The present invention also relates to a method for portioning a continuous strand formed from a food product covered with a casing comprising a clamping step wherein the strand is clamped to push out the food product and empty the casing along a segment of casing, characterised in that said clamping step comprises
    clamping the casing in order to empty the casing along a first central casing segment,
    subsequently clamping the casing on each side of said central segment to empty the casing along two side casing segments, arranged on each side of the central segment.

The clamping of the casing to empty the casing along a first central casing segment is progressive transversal clamping in relation to said strand.

The clamping of the casing to empty the casing along two side casing segments is progressive transversal clamping of said strand, or progressive longitudinal clamping of the strand in both longitudinal directions opposite the central segment.

According to one embodiment, the method comprises during the clamping step, holding the strand along outer casing segments adjacent to said side segments in order to guide the movement of the food product when the food product is pushed from the central segment and the side segments and to retain a given cross-section of the strand along said side segments, for example, substantially equal to the cross-section of the strand before clamping.

According to one embodiment, during the clamping in order to empty the casing along the two side segments, the strand is rotated in opposite directions upstream and downstream from the emptied central portion in order to twist said emptied central portion.

According to one embodiment, clamping of the casing along the two side segments starts before said central segment is emptied.

According to one embodiment, the method comprises a cutting step comprising cutting of the casing at the central segment after clamping the casing along the side segments, the clamping of the central segments and the side segments being released after cutting.

BRIEF DESCRIPTION OF THE DRAWINGS

The invention will be understood better, and further aims, details, features and advantages will emerge more clearly during the detailed explanatory description hereinafter of two currently preferred particular embodiments of the invention, with reference to the appended schematic figures wherein.

DETAILED DESCRIPTION OF THE PREFERRED ENBODIMENTS

Figure 1:
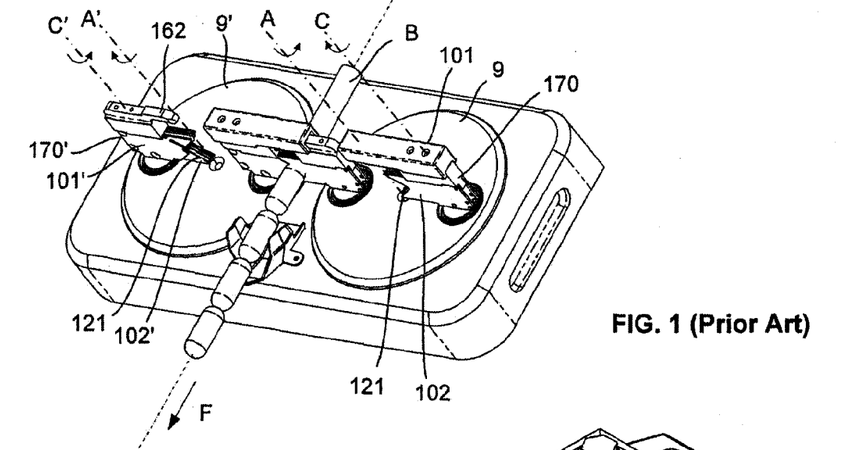
FIG. 1 is a schematic perspective view of a portioning device equipped with a pair of clamps according to the prior art.

FIG. 1 illustrates a portioning device according to the prior art, as described in particular in the abovementioned patent documents WO2008/155491 and WO2010/006893, wherein the clamps are rotatably mounted on rotary disks in order to be moved according to a to-and-fro movement by circular translation. The device comprises a first rotary disk 9 having an axis of rotation A, and a second rotary disk 9' having an axis of rotation A', mounted on the upper part of a frame (not shown), both axes of rotation A, A' being arranged parallel in relation to each other and substantially perpendicular to the feed direction F of a continuously fed strand B to be portioned. A first pair of clamps comprises a first clamp 101 pivotally mounted on the first rotary disk 9 about an axis of rotation C arranged parallel to the axis A of the disk and at a distance therefrom, and a second clamp 101' mounted in a similar manner on the second disk 9' about an axis of rotation C' parallel to the axis A'.

The first clamp 101 comprises a plurality of clamping plates 102, for example four in number, parallel with each other, and at a distance from each other. Each plate has at the front end thereof a notch defining a clamping edge 121 having an overall V shape. The main plates are rigidly connected to a mounting support 170 whereby the clamp is pivotally mounted on the first disk, the plates thereof being arranged parallel to the axis of rotation C. Similarly, the second clamp 101' comprises four clamping plates 102' with clamping edges 121', and a mounting part 170'. The disks are rotated about the axis A and A' thereof in opposite directions, such that the clamps move in the strand feed direction F when they are in contact therewith, and at the same speed as that of the strand, and the clamps are rotated on the disks about the axis C and C' thereof so as to remain arranged constantly perpendicular to the feed direction F, and parallel with each other, with the clamping edge thereof opposite. When the clamps move to the closed position, the main plates of one clamp are intercalated with those of the other clamp such that two successive plates overlap similar to shears and form via the front edges thereof a passage or diaphragm with a progressively decreasing cross-section, in order to progressively clamp the strand and push the food product progressively from the clamping area.

The device comprises a cutting system comprising a flat blade (not shown), pivotally mounted on the first clamp. The blade is moved elastically by a spring into a retracted position wherein the blade is arranged between two plates, retracted in relation to the clamping edge thereof. The blade is suitable for engaging with the free end of an actuating tappet 162 mounted on the second clamp in the closed position of clamps in order to pivot the blade against the spring to an active position to cut the clamped area of the strand. As illustrated in FIG. 1, the rotary disks comprise a second pair of clamps. On each disk, the clamps are arranged symmetrically on each side of the axis of rotation of the disk.

Figure 2:
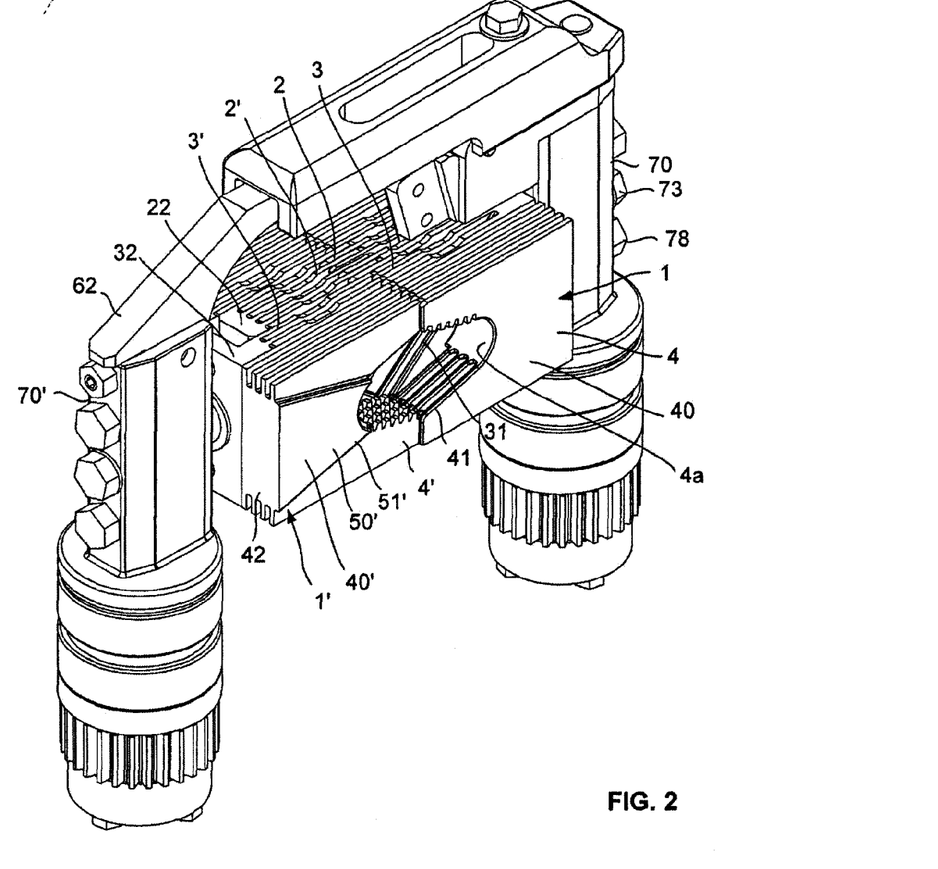
FIG. 2 is an enlarged schematic perspective view of a pair of clamps according to a first embodiment of the invention, the clamps being in an open position.
Figure 3:
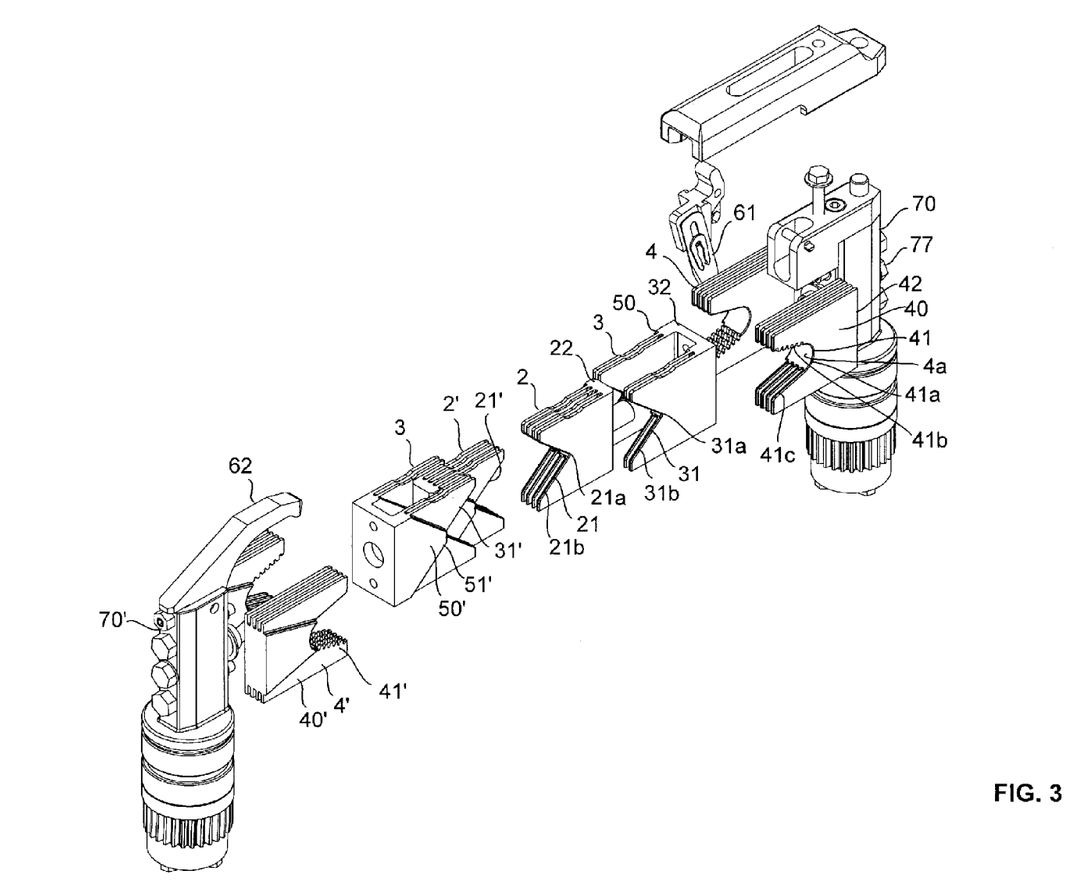
FIG. 3 is an exploded schematic perspective view of the various constituent elements of the pair of clamps in FIG. 2.

FIGS. 2 and 3 illustrate a pair of clamps 1, 1' according to the invention, comprising a first clamp 1 and a second clamp 1' suitable for use on the device in FIG. 1, instead of the pairs of clamps 101, 101' described above.

The first clamp 1 comprises central clamping plates 2, side clamping plates 3 arranged on each side of the central clamping plates, and holding blocks 4 arranged on each side of the side clamping plates, formed from a plurality of holding plates 40. The plates 2, 3, 40 are mounted on a mounting support structure 70 whereby the clamp is pivotally mounted on a disk about the abovementioned axis C. The plates 2, 3, 40 all have the same thickness, are arranged parallel with each other, parallel with the axis of rotation C and perpendicular to the strand feed direction, and are spaced from each other by the same distance. In the present embodiment, the first clamp comprises four central clamping plates 2, two side clamping plates 3 arranged on each side of the set of four central clamping plates, and four holding plates 40 arranged next to each set of two side clamping plates.

Each central clamping plate 2 has at the front end thereof a notch defining a clamping edge 21 having an overall V shape, and each side clamping plate 3 has at the front end thereof a notch defining a clamping edge 31 having an overall V shape, said clamping edges 21 and 31 have identical profiles, with two inclined portions 21b, 31b interconnected by a concave rear portion 21a, 31a.

Each holding plate 40 has at the front end thereof a notch defining a holding edge 41. The holding edges of the holding plates have identical profiles, with a substantially semicircular concave rear portion 41a extended at each end with two inclined portions 41b, 41c. The diameter of the rear portion 41a is in this case less than the diameter of the strand B to be portioned.

The central clamping plates 2 are formed from one piece, with a base 22 from which the central plates extend parallel with each other. The side clamping plates 3 are formed from one piece having an overall U shape, with a base 32 forming the base of the U, from which two sets of side clamping plates extend to form the arms of the U. The central clamping plates 2 are placed between the two sets of side clamping plates and are slidably mounted on the mounting support, perpendicular to the axis C. The side clamping plates are slidably mounted on the support perpendicular to the axis C.

Figure 5A:
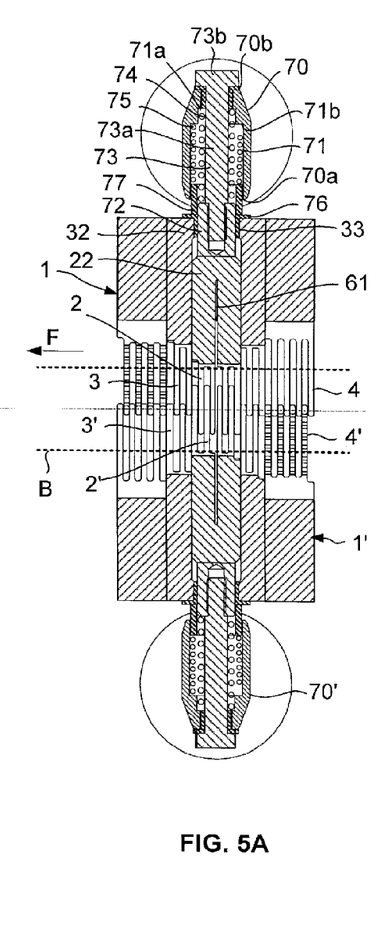
FIGS. 5A to 5E are horizontal sectional views, along the cutting plane V-V in FIG. 4, of the pair of clamps in the different positions mentioned above.
Figure 5B:
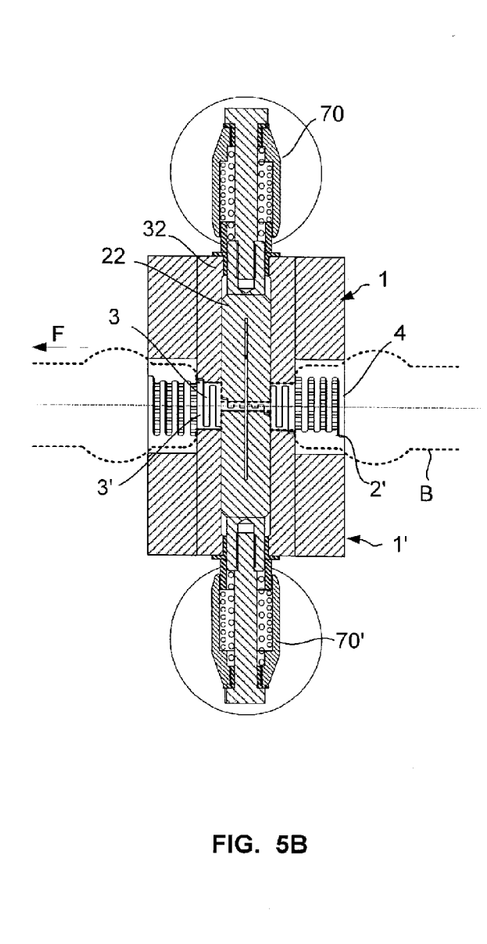

For this slidable assembly, with reference to FIG. 5A, the base 22 of the is central clamping plates is rigidly connected to a mounting rod 72, 73, passing through a bore 33 of the base 32 of the side plates and slidably mounted in a bore 71 of the support 70 extending perpendicular to the mounting axis C of the front face 70a to the rear face 70b of the support. The mounting rod is formed from a tubular tip 72, provided with a threaded hole, which is assembled on the base 32, and a bolt 73 wherein the threaded end of the rod 73a thereof is screwed into the tip 72, and wherein the head 73b is suitable for bearing against the rear face of the support.

The central plates and the side plates are elastically moved, respectively by first elastic means 74, and second elastic means 75, to an idle position illustrated in FIG. 5A, wherein the bolt head 73b presses against the rear face 70b of the support, and the side plates are offset in relation to the central plates such that the clamping edges 31 thereof are outwardly offset in relation to the clamping edges 21 of the central plates. The base 22 of the central plates is arranged at a distance from the base 32 of the side plates. In this idle position, the base 32 of the side plates is arranged at a distance from the mounting support 70.

The first elastic means acting on the central plates comprise a first helical compression spring 74 mounted about the rod 73a of the bolt and bearing against a first inner shoulder 71a of the bore 71 and against the circular edge of the tip 72.

The second elastic means acting on the side plates comprise a second helical compression spring 75, coaxial with the first spring, with a larger diameter, and bearing against a second inner shoulder 71b of the bore and against the base of the side plates. In the present embodiment, the bore 33 of the base 32 is equipped with a guiding ring 76 with a collar. The tip 72 of the central plates slides with said ring and in a guiding tube 77 arranged bearing against said ring and sliding in the bore 71 of the support. The second spring 75 is mounted bearing against said second shoulder 71b and the rear edge of the guiding tube.

As described hereinafter, the central plates 2 are suitable for moving in relation to the support thereof against the first spring 74, from the idle position to an intermediate retracted position, wherein the clamping edges 21 of the central plates 2 and those 31 of the side plates 3 are aligned, the base 22 of the central plates abutting against the base 32 of the side plates. When the central plates are in the intermediate retracted position thereof, and the side plates in the idle position thereof, the central plates and the side plates are suitable for moving against the springs 74, 75 to a retracted position wherein the side plates abut via the base 32 thereof against the support, with the collar of the ring 76 inserted between the support and said base.

Secondary guiding rods 78 (FIG. 2) are mounted in bores of the support, above and below the bolt 73, and have ends sliding in bores of the base 32 in order to guide the sliding of the side plates, parallel with the axis C.

A block 4 formed of four holding plates 40 is attached to the side of each set of two side plates, such that the semicircular portions 41a of the holding plates are offset to the rear in relation to the clamping edges of the side plates. Each block 4 is formed from one piece with a base 42 from which the four holding plates extend, the rear portions 41a of the edges of the plates forming a block holding surface 4a. The four holding plates are fixedly assembled by the base 42 thereof to the base 32 of the side plates 2 via assembly means (not shown).

The second clamp 1' is substantially identical to the first clamp. It comprises central clamping plates 2', four in number, with clamping edges 21', two sets of two side clamping plates 3' arranged on each side of the central clamping plates, provided with clamping edges 31', and two blocks 4' of four holding plates 40' with holding edges 41'. These plates 2', 3', 40' are mounted as described above on a mounting support 70'.

When the clamps 1, 1' move to the closed position, the plates from one clamp are intercalated with those of the other clamp.

Each clamp comprises intermediate plates 50, 50' arranged in alternation with the central and side clamping plates, and the holding plates. Each intermediate plate of a clamp comprises a bearing edge 51', having a complementary shape with the edge of the clamping plate or the holding plate of the other clamp, to be arranged opposite in the closed position of the clamps. The bearing edge of the intermediate plates comprises a concave central portion, of a similar shape to that of the concave portion of the plate arranged opposite, and inclined portions against which the inclined portions of the edge of the opposite plate are suitable for abutting against when the clamps move close together, as described hereinafter. In the present embodiment, for each clamp, the central plates and the associated intermediate plates thereof are formed from one piece, the concave portions of said plates being aligned. Similarly, the side plates and the associated intermediate plates thereof are formed from one piece, the concave portions thereof being aligned. Each set of four holding plates and the associated to intermediate plates thereof are formed from one piece, the concave portions thereof being aligned and thus form a continuous holding surface 4a.

Each clamp comprises a block wherein the holding plates comprise notched upper inclined portions 41b and lower inclined portions 41c, which are not notched, described as continuous or smooth, and a block wherein the holding is plates comprise notched upper inclined portions and continuous upper inclined portions. For two opposite blocks, one block of a clamp has notched upper inclined portions and continuous lower inclined portions, and the block of the other clamp has continuous upper inclined portions and notched lower inclined portions.

Figure 4:
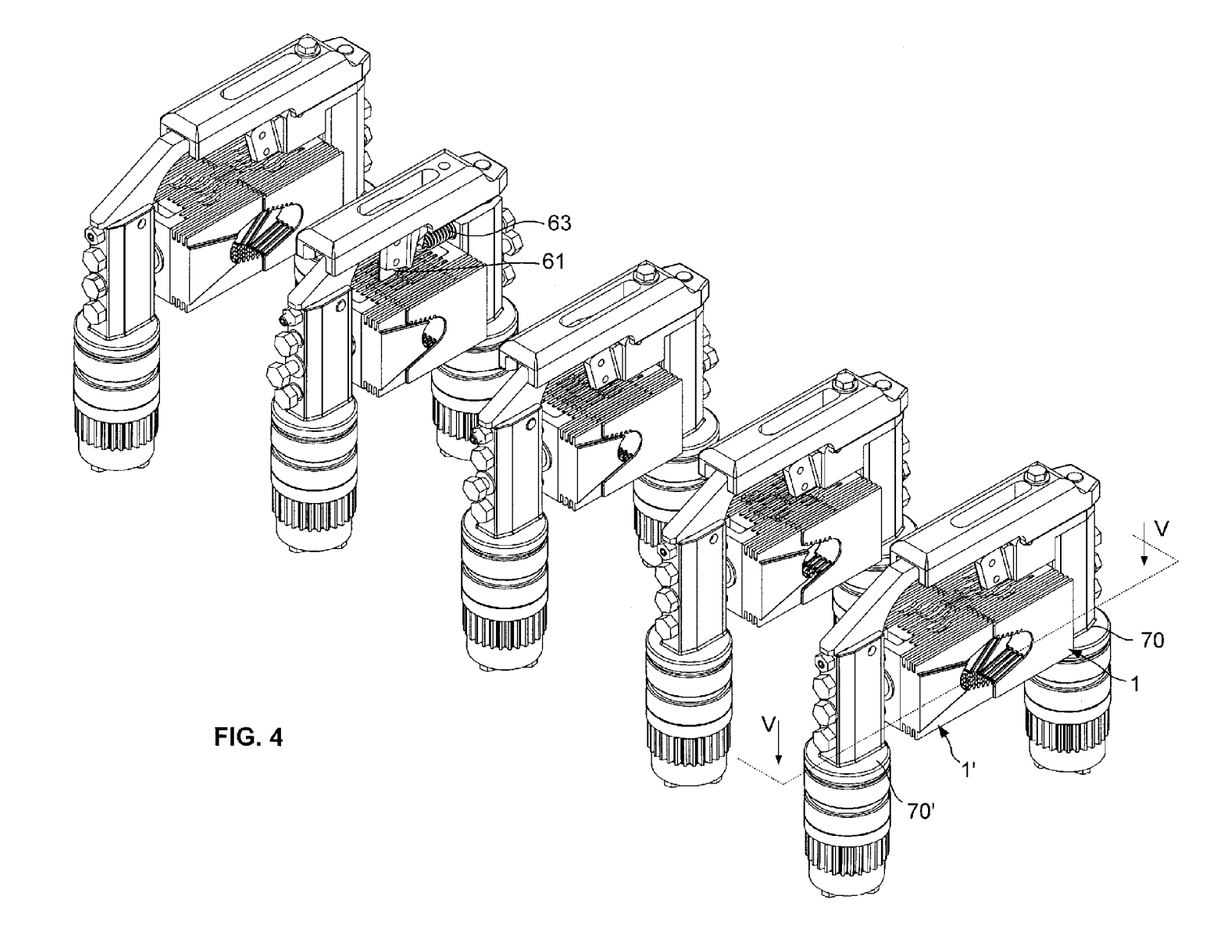
FIG. 4 is a perspective view of the pair of clamps in FIG. 2 in four different clamp positions: open position, intermediate closed position, closed position, cutting position, and open position.

The cutting system comprises a flat blade 61, pivotally mounted on the mounting support 70 of the first clamp, about an axis of rotation perpendicular to the plates. The blade is arranged between two central plates and is elastically moved by a spring 63 (FIG. 4) into a retracted position wherein the blade is arranged between two central plates, retracted in relation to the clamping edge thereof. The blade is suitable for engaging with the free end of an actuating tappet 62 mounted on the second clamp, as described hereinafter, in order to pivot the blade against the spring to an active position to cut the clamped area of the strand.

The operation of a pair of clamps for portioning a strand will not be described with reference to FIGS. 5A to 5E.

FIG. 5A illustrates an open position of the clamps wherein the clamps come into contact with the strand B via the clamping edges of the central plates. The plates 2, 3, 40 of the first clamp are intercalated with the plates 2', 3', 40' of the second clamp. The central plates and the side plates are moved by the spring 74, 75 thereof into the idle position thereof.

The rotation of the disks actuates a movement of the mounting supports 70, 70' towards each other, perpendicular to the strand feed direction F. When moved together, the strand is clamped by the clamping edges 21 of the central plates and the clamping edges 31 of the side plates. The clamps move closer to each other to the intermediate closed position illustrated in FIG. 5B, wherein the central plates of one clamp abut against the intermediate plates of the other clamp. In this intermediate closed position, the diaphragms formed by the clamping edges of the central plates have minimum cross-sections. The casing is emptied along a central casing segment corresponding to the widths of the central plates of the clamps. The clamping edges of the side plates are retracted in relation to the clamping edges of the central plates, as in the open position. The holding edges of the holding plates are against the strand and make it possible to guide the food product pushed by the central plates and the side plates towards the centre of the portions to be formed.

Figure 5C:
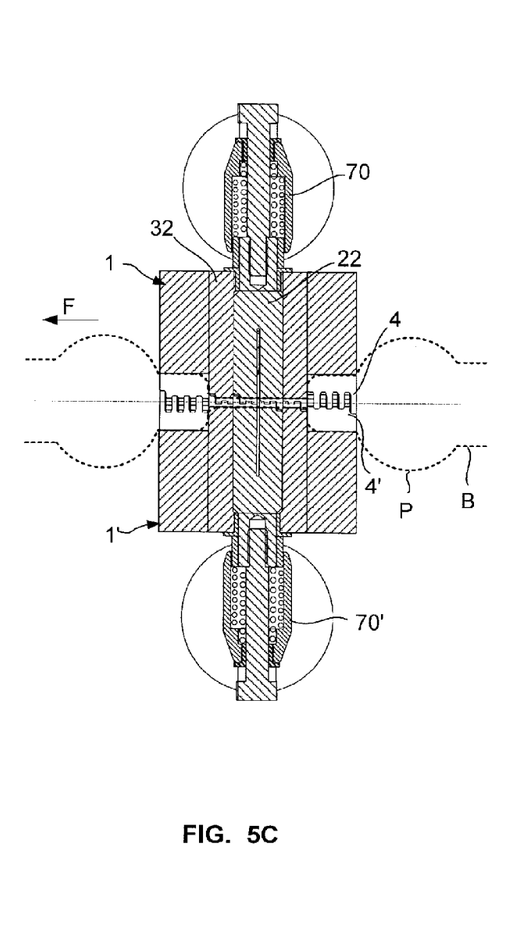

When the two mounting supports move even closer together, the central plates abutting against the intermediate plates slide outwards, between the side plates, and the side plates of the clamps move closer together up to the closed position of the clamps illustrated in FIG. 5C. In this closed position, the side plates define side diaphragms having minimum cross-sections equal to those of the central diaphragms formed by the central plates. The casing is emptied along two additional side segments on each side of the abovementioned central segment. The central plates are in the intermediate retracted position, abutting by the base thereof against the base of the side plates. The side plates abut against the intermediate plates arranged opposite each other and are still in the idle position in relation to the mounting support thereof. The holding plates fixedly mounted in relation to the side plates form overall circular outer diaphragms, wherein the cross-sections are less than that of the strand, for guiding the food product beyond the holding plates. The internal pressure P in the casing is separated from the empty central segment and the empty side segments of the casing. When moving from the intermediate closed position to the closed position, the notched inclined portions of the blocks which are arranged upstream from the side plate in relation to the feed direction, rotate the strand in one direction of rotation (anticlockwise direction in the figures) upstream from the clamps, and the notched inclined portions of the downstream blocks rotate the strand in the opposite direction of rotation downstream from the clamps, thus creating a twisted central segment.

Figure 5D:
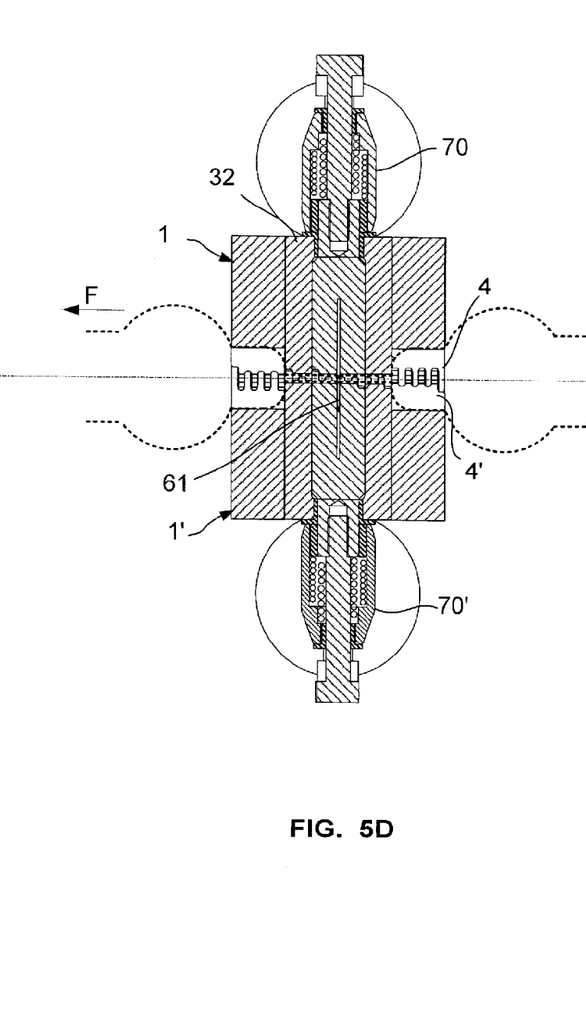

When the supports 70, 70' are moved closer together, the central plates and the side plates, abutting against the intermediate plates, slide towards the mounting support thereof, against the springs 74, 75, to the so-called cutting position of the clamps illustrated in FIG. 5D. In this cutting position, the main plates and the side plates are in a retracted position, wherein the central plates abut against the base of the side plates, and the side plates abut via the base thereof against the mounting supports. From the closed position in FIG. 5C to the cutting position in FIG. 5D, the mounting supports move closer to each other, with no relative movement of the plates in relation to each other. When the supports move closer together, the tappet 62 manoeuvres the blade 61 in order to move same from the active position thereof to cut the strand in the centre of the twisted empty central segment of the casing.

Figure 5E:
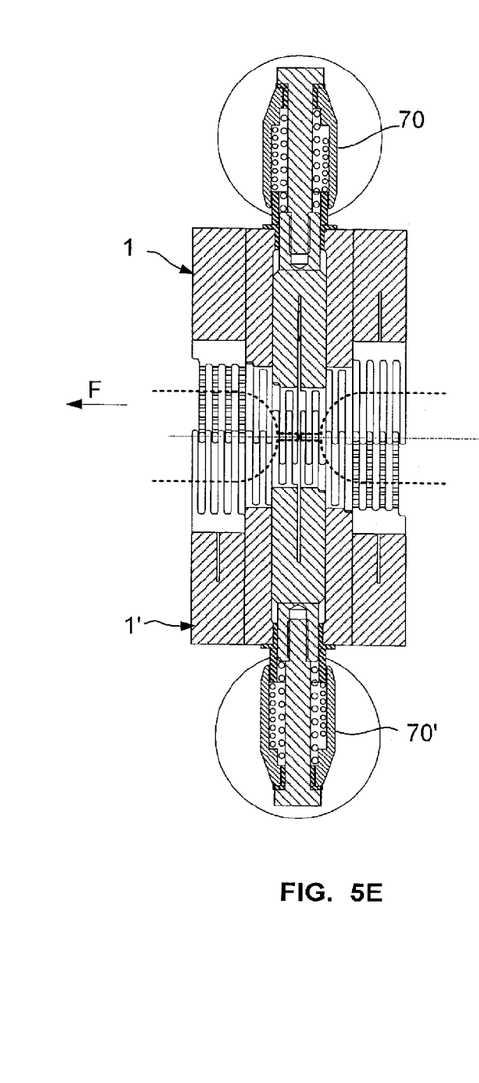
Figure 6A:
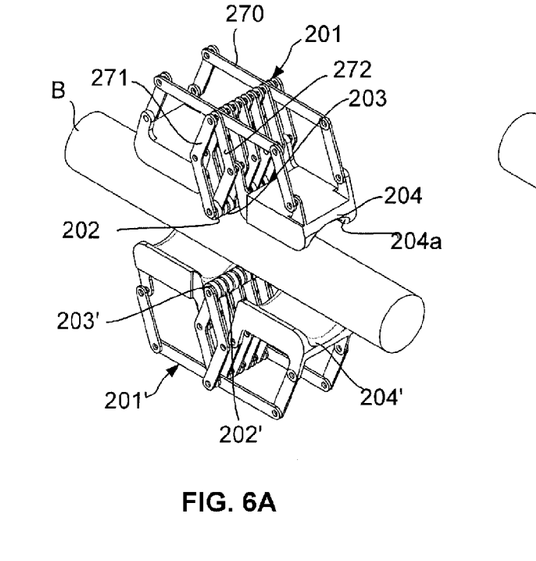
FIG. 6A illustrates a perspective view of a pair of clamps according to a second embodiment of the invention, the clamps being in an open position.
Figure 6B:
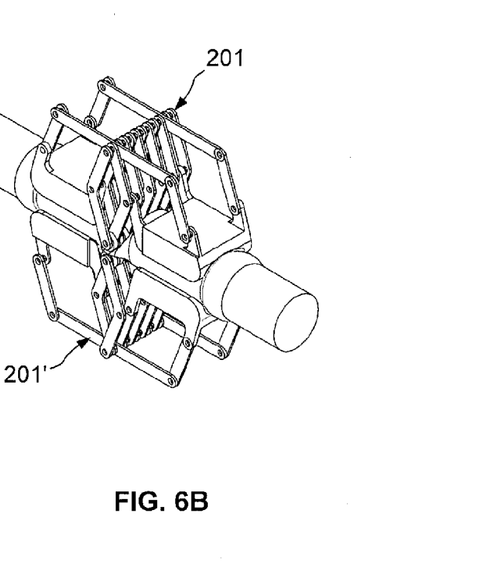
FIGS. 6B and 6C are perspective views similar to those in FIG. 6A, the clamps being in an intermediate closed position and in a closed position, respectively.
Figure 6C:
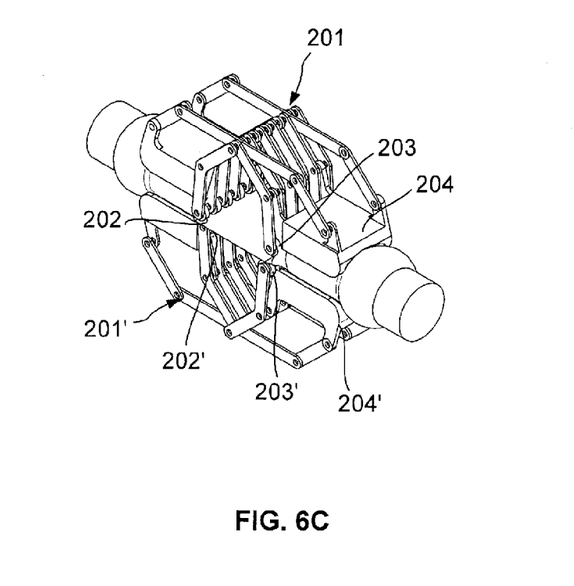

The supports are then separated from each other as illustrated in FIG. 5E, illustrating an open position of the clamps similar to that in FIG. 5A. The central plates and the side plates return to the idle position thereof under the effect of the springs. The food product contained in the casing returns to the empty segments is of the casing. However, small twisted empty casing tails remain at the ends of each portion.

FIGS. 6A to 6C and 7A to 7B represent a pair of clamps according to a second embodiment, said pair comprising a first clamp 201 and a second clamp 201' arranged on each side of the strand B.

Each clamp comprises first rollers 202, 202' and second rollers 203, 203' rotatably mounted respectively at the ends of first connecting rods 271 and second connecting rods 272 of a support system 270, about axes of rotation perpendicular to the strand feed direction. In the open position of the clamps illustrated in FIGS. 6A and 7A, the first and second rollers of a clamp are arranged in alternation in a row, the axes of rotation thereof being substantially aligned. Each clamp comprises on each side of the first and second rollers, a holding block 204, 204' equipped with a concave holding surface 204a. Each clamp comprises a first block, also referred to as the left block, and a second block, also referred to as the right block.

Figure 7A:
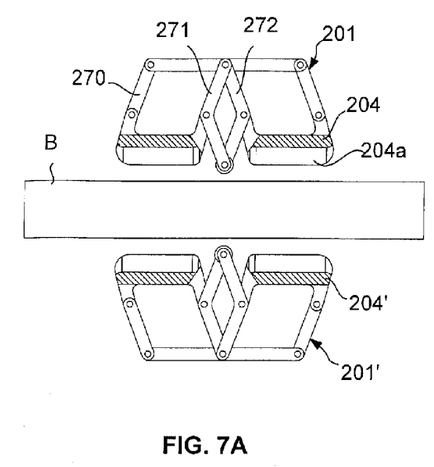
FIGS. 7A, 7B and 7C are schematic longitudinal sectional views of the pair of clamps in FIGS. 6A, 6B and 6C respectively.
Figure 7B:
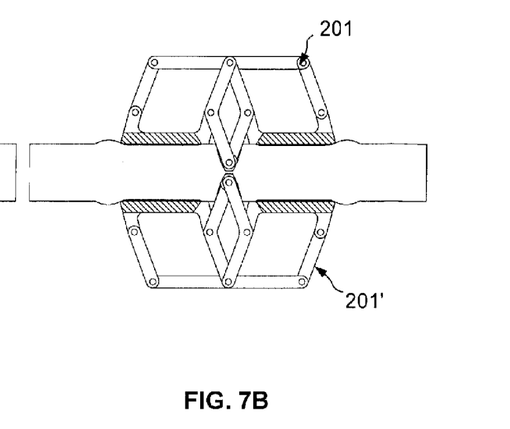
Figure 7C:
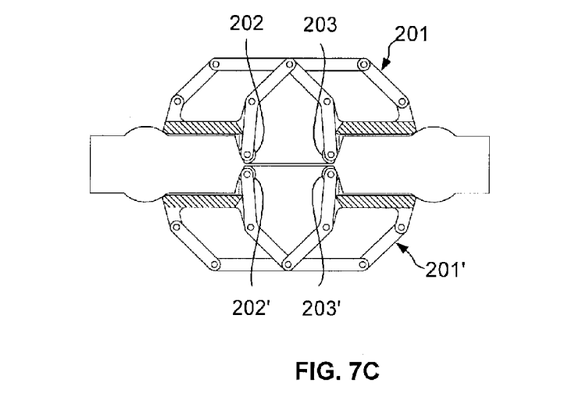

In the open position, the rollers 202, 203 and the blocks 204 of the clamps are arranged opposite each other, away from the strand, the holding surfaces 204a of the blocks 204, 204' being outwardly offset in relation to the rollers. An actuating system (not shown) is suitable for moving the clamps towards each other transversally to the strand up to an intermediate closed position illustrated in FIGS. 6B and 7B, wherein the first and second rollers of the clamps clamp the strand and empty the casing thereof along a first central segment. In this intermediate closed position, the blocks are in contact via the holding surface thereof against the strand on either side of the emptied central segment. The actuating system then acts on the clamp support systems to simultaneously move the first rollers 202, 202' and the first blocks, longitudinally, parallel with the strand, opposite the first emptied segment, to the left, and to simultaneously move the second rollers 203, 203' and the second blocks, longitudinally, opposite the emptied central segment, to the right, to the closed position of the clamps illustrated in FIGS. 6C and 7C.

Figure 8:
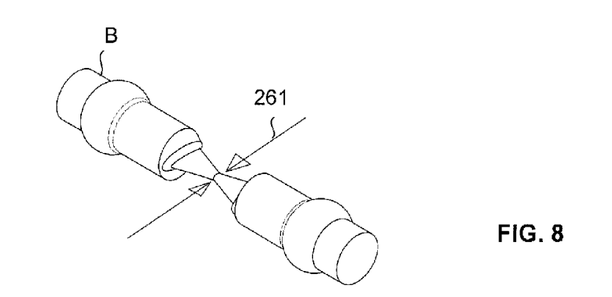
FIG. 8 is a schematic view illustrating the strand cutting operation in FIGS. 6C and 7B.

During this longitudinal movement, the first and second rollers progressively push the product from the casing on each side of the central segment, along two second side segments. The casing is emptied flat by the rollers and has flat emptied casing segments. When the product is emptied from the casing, the casing is held by the holding means. The strand is then cut at the emptied central segment by cutting means illustrated schematically under the reference 261 in FIG. 8. After cutting, the clamps are returned to the open is position thereof in FIGS. 6A and 7A.

Although the invention has been described in relation to two particular embodiments, it is obvious that it is in no way restricted and that it includes any technical equivalents of the means described and the combinations thereof if they fall within the scope of the invention.

What is claimed:

1. Device for portioning a continuous strand (B), comprising at least one pair of opposing clamps (1, 1'; 201, 201') suitable for being moved towards each other by actuating means, from an open position to a closed position in order to clamp the strand, characterised in that each clamp of the pair comprises clamping means (2, 2', 3, 3'; 202, 202'; 203, 203') suitable for being manoeuvred by said actuating means (70, 9; 70', 9') in order to clamp the strand along a central strand segment in a first position, and subsequently moved to a second portion to clamp the strand along side strand segments on each side of a central segment.

2. Device according to claim 1, characterised in that each clamp of the pair comprises central clamping means (2, 2') and side clamping means (3, 3') arranged on each side of the central clamping means, said actuating means (70, 9; 70', 9') being suitable for manoeuvring the central clamping means and the side clamping means of the clamps, transversally to the strand, in order to clamp the strand the central strand segment in a first position, and subsequently manoeuvring the side clamping means into a second position, transversally to the strand, order to clamp the strand on each side of the central clamping means, along the side strand segments.

3. Device according to claim 2, characterised in that the central clamping means comprise at least one central clamping plate (2, 2') provided at the end with a clamping edge (21), and the side clamping means comprise at least one side clamping plate (3, 3') arranged on each side of the central clamping plate, and provided at the end with a clamping edge (31), the two clamps being offset in relation to each other such that, when moved to the closed position, the central and side clamping plates of the clamps respectively form via the clamping edges thereof one central passage or diaphragm and two side passages or diaphragms with progressively decreasing cross-sections, for each clamp, the clamping edges (31) of the side plates (3) are transversally outwardly offset in relation to the clamping edge (21) of the central clamping plate (2) in the open position of the clamps, said actuating means (70, 9; 70', 9') being suitable for manoeuvring the central clamping plate (2) and the side clamping plates (3) to progressively and simultaneously reduce the cross-sections of the side passages and the central passage, from the open position of the clamps to an intermediate closed position wherein the central passage has a minimum cross-section and the side passages have cross-sections greater than the minimum cross-section of the central passage, subsequently manoeuvring the side clamping plates (3) in order to progressively reduce the cross-sections of the side passages, from the intermediate closed position to the closed position wherein the side passages have minimum cross-sections identical to the minimum cross-section of the central passage.

4. Device according to claim 3, characterised in that each clamp (1, 1') comprises at least two central clamping plates (2, 2') and/or at least two side clamping plates (3, 3') on each side of the central clamping plate(s).

5. Device according to claim 4, characterised in that each clamp (1, 1') comprises at least four central clamping plates (2), and at least two side clamping plates (3) on each side of the central clamping plates.

6. Device according to claim 3, characterised in that the central clamping plates (2, 2') and the side clamping plates (3, 3') of each clamp (1, 1') are mounted on a mounting support (70, 70'), said actuating means being suitable for moving the mounting supports according to a to-and-fro movement perpendicular to the strand feed direction (F), the central clamping plates (2) being slidably mounted on the mounting support thereof and moved by first elastic means (74) to an idle position, said central plates of a clamp being suitable for abutting against bearing edges (51') of intermediate plates (50, 50') of the other clamp in the intermediate closed position of the clamps and for moving in relation to the mounting support thereof to an intermediate retracted position when the clamps are moved from the intermediate closed position to the closed position.

7. Device according to claim 6, characterised in that the blade (61) is pivotally mounted on the mounting support (70) of a first clamp (1), said actuating means being suitable for pivoting said blade between a retracted position and an active cutting position, the blade (61) is moved by elastic return means to the retracted position thereof, the actuating means being mounted on the second clamp (1') of the pair and comprising a tappet (62) mounted on the mounting support (70') of the second clamp, suitable for abutting the blade (61) in order to manoeuvre the blade towards the active position thereof against the elastic return means.

8. Device according to claim 7, characterised in that the side clamping plates (3, 3') are slidably mounted on the mounting support (70, 70') thereof and are moved by second elastic means (75) into an idle position, said side clamping plates of a clamp being suitable for abutting against bearing edges (51') of intermediate plates (50, 50') of the other clamp in the closed position of the clamps, the central clamping plates and the side clamping plates being suitable for moving in relation to the mounting support thereof to a retracted position when said clamps are moved from the closed position to a so-called cutting position by approaching the mounting support thereof, the tappet (62) moving the blade (61) from the retracted position thereof to the active position thereof when moving from the closed position to the cutting position.

9. Device according to claim 3, characterised in that the central clamping means comprises cutting means comprising at least one blade (61) associated with the pair of clamps suitable for being manoeuvred by actuating means (62) between two adjacent central clamping plates in order to cut the strand.

10. Device according to claim 1, characterised in that each clamp of the pair comprises clamping means (202, 202', 203, 203') suitable for being manoeuvred transversally to the strand by said actuating means, in order to clamp the strand along a central strand segment in a first position, and subsequently for being manoeuvred parallel to the strand in order to clamp the strand on the side segments in a second position.

11. Device according to claim 1, characterised in that each clamp (1, 1', 201, 201') further comprises holding means (4, 4'; 204, 204'), arranged on each side of the clamping means, suitable for being moved by said actuating means in order to abut the strand on outer segments of the strand arranged on each side of the side segments, in the closed position of the clamps, in order to hold said strand.

12. Device according to claim 11, characterised in that the holding means comprise at least one holding block (4, 4'; 204, 204') arranged on each side of the clamping means, and provided with a holding surface (4a, 204a) which is transversally outwardly offset in relation to the clamping means in the open position of the clamps and in the closed position of the clamps.

13. Device according to claim 12, characterised in that the at least one holding block (4) comprises at least one holding plate (40) arranged on the outside of each side clamping plate (3), and provided at an end with a holding edge (41) wherein a rear portion (41a) forms said holding surface (4a), the holding edges being transversally outwardly offset in relation to the clamping edges (31) of the side plates (3) in the open position of the clamps, the holding plates form via the holding edge thereof respectively an outer passage wherein the cross-section decreases progressively when the clamps move to the closed position, said actuating means (70, 9; 70', 9') being suitable for manoeuvring the holding plates (40) in order to progressively and simultaneously reduce the outer passages, from the open position to the intermediate closed position, wherein the outer passages have cross-sections greater than the minimum cross-sections of the side passages, and subsequently from the intermediate closed position to the closed position wherein the outer passages have cross-sections greater than the minimum cross-sections of the side passages.

14. Device according to claim 13, characterised in that the holding edge (41) of each holding plate (40) of a block (4) comprises a rear portion (41a), forming the holding surface (4a), extended by an upper portion (41b) and a lower portion (41c), each clamp comprises a block wherein each holding plate comprises a notched upper portion (41b) and a continuous lower portion (41c), and a block wherein each holding plate comprises a notched lower portion and a continuous upper portion, and for two opposing blocks, each holding plate of the block of a clamp has a notched upper portion and a continuous lower portion, and each holding plate of the block of the other clamp has a continuous upper portion and a notched lower portion.

15. Device according to claim 13, characterised in that each clamp (1, 1') comprises at least two holding plates (40) on each side of the central and side clamping plates.

16. Device according to claim 15, characterised in that each clamp (1, 1') comprises at least four holding plates (40) on each side of the central (2) and side clamping plates (3).

* * * * *